(12) United States Patent
Anderle

(10) Patent No.: US 7,907,249 B2
(45) Date of Patent: Mar. 15, 2011

(54) FILM EXPOSER AND METHOD FOR EXPOSING LIGHT-SENSITIVE FILMS

(75) Inventor: Klaus Anderle, Darmstadt (DE)

(73) Assignee: GBVV Holdings S.A.R.L., Luxembourg (LU)

( * ) Notice: Subject to any disclaimer, the term of this patent is extended or adjusted under 35 U.S.C. 154(b) by 1563 days.

(21) Appl. No.: 11/196,077

(22) Filed: Aug. 3, 2005

(65) Prior Publication Data

US 2006/0054777 A1 Mar. 16, 2006

(30) Foreign Application Priority Data

Aug. 6, 2004 (DE) .......................... 10 2004 038 554

(51) Int. Cl.
G02B 27/14 (2006.01)
G02B 27/28 (2006.01)
G02F 1/01 (2006.01)
(52) U.S. Cl. .................... 352/46; 352/26; 352/92; 349/2
(58) Field of Classification Search .................. 352/5, 6, 352/8, 11, 22, 26, 27, 28, 55, 92, 46, 12; 349/2, 3; 355/33, 35, 50
See application file for complete search history.

(56) References Cited

U.S. PATENT DOCUMENTS

| | | | | |
|---|---|---|---|---|
| 4,766,503 A | | 8/1988 | Lambert et al. ................ 358/332 |
| 5,369,433 A | * | 11/1994 | Baldwin et al. .......... 348/207.99 |
| 5,667,944 A | | 9/1997 | Reem et al. .................... 430/359 |
| 6,480,259 B1 | * | 11/2002 | Wong et al. ...................... 355/52 |
| 6,580,490 B1 | * | 6/2003 | Wong et al. ...................... 355/40 |
| 6,624,949 B2 | * | 9/2003 | Roddy et al. ................... 359/634 |
| 6,686,947 B2 | * | 2/2004 | Druzynski et al. ............. 347/239 |
| 6,778,290 B2 | * | 8/2004 | Oehlbeck et al. ............ 358/1.15 |
| 7,023,463 B2 | * | 4/2006 | Ramanujan et al. .......... 347/239 |
| 7,292,314 B2 | * | 11/2007 | Prigent ............................ 355/67 |
| 2003/0193556 A1 | * | 10/2003 | Druzynski et al. ............. 347/239 |
| 2007/0171373 A1 | * | 7/2007 | Bjerkestrand ................... 352/11 |

FOREIGN PATENT DOCUMENTS

| | | |
|---|---|---|
| DE | 198 47 565 A1 | 4/2000 |
| EP | 1 033 873 A2 | 2/2000 |
| WO | 03/096 685 A1 | 11/2003 |

* cited by examiner

*Primary Examiner* — William C Dowling
(74) *Attorney, Agent, or Firm* — Arent Fox LLP

(57) ABSTRACT

A film exposer has a modulator which modulates light from a light source and projects it onto a light-sensitive film guided continuously past the modulator. The modulator comprises a two-dimensional arrangement of elements which each project a specific quantity of light onto the film. A pixel entering the projection area of the modulator of the film on one side integrates the light which is projected onto the pixel by elements arranged in a row in the transport direction of the film. The quantity of light integrated by the pixel depends on how many elements are switched on, that is to say project light onto the film, while the film passes through the projection area of the modulator. The total quantity of the light to be integrated can be adjusted for each pixel by appropriate control of the elements respectively lying in a row in the transport direction of the film. In one embodiment of the film exposer, the quantity of light projected by individual elements or groups thereof can be adjusted individually or differs by area.

15 Claims, 4 Drawing Sheets a) Fig. 6 b)      Fig. 7

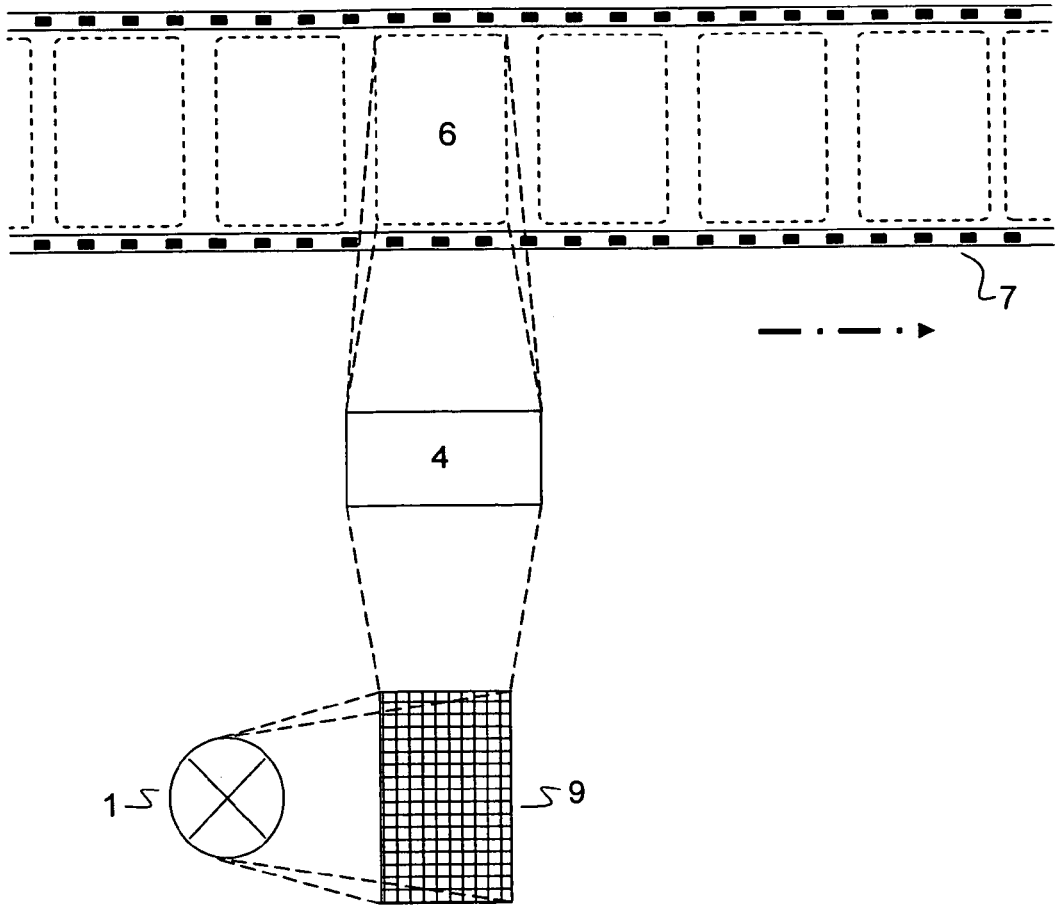
Fig. 3　　　　　　　　　　　　　　　　Prior Art
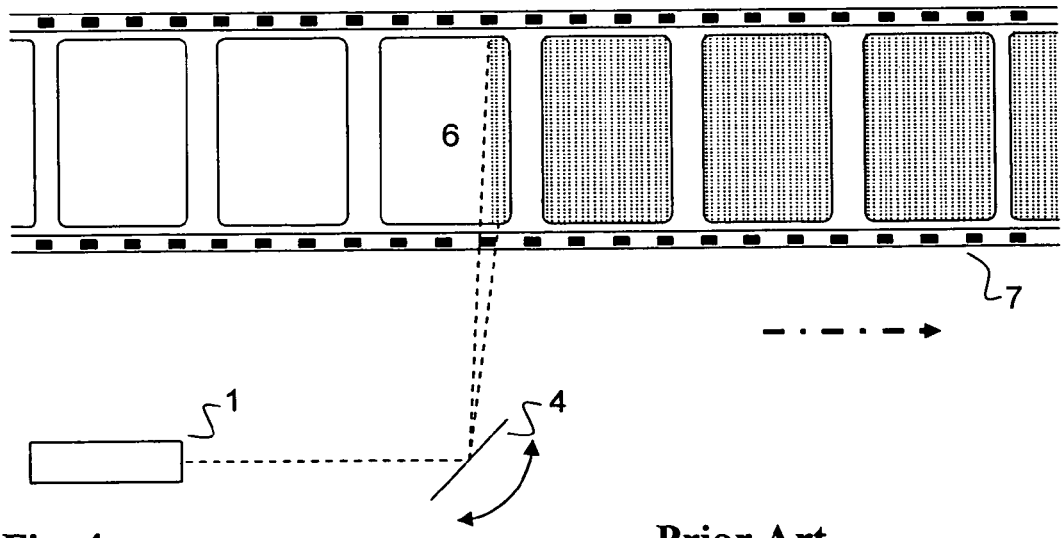
Fig. 4　　　　　　　　　　　　　　　　Prior Art

FILM EXPOSER AND METHOD FOR EXPOSING LIGHT-SENSITIVE FILMS

This application claims the benefit, under 35 U.S.C. §119 of European Patent Applications 10200403855438. filed Aug. 6, 2004.

FIELD OF THE INVENTION

The invention relates to exposing cinematographic films.

BACKGROUND OF THE INVENTION

During analogue copying of cinematographic films, an already exposed film, for example, serves as a copying master, and a light-sensitive film is exposed. It is possible to provide an optical system between the original and the film to be exposed, or the films are guided past one another at a very short spacing.

The digital exposure of light-sensitive films, for example when producing the master of a cinematographic film is usually performed nowadays by individual image, that is to say image by image. In this process, the film is guided past an exposure unit in stepwise fashion. In order to expose an image, the film transport is interrupted, the film is exposed and the film transport is continued until the next area to be exposed is positioned in front of the exposure unit. The film transport is interrupted again, and the next image is exposed. Further known methods utilize light beams, for example from one or more lasers, which are deflected over the area to be exposed in linewise fashion, their intensity being modulated in the process. After a line has been written, the film is transported further and the next line is exposed. This is repeated until an entire image has been written. Thereafter, the film is released from its fixture and the latter is displaced further by an entire image. Alternatively, the deflection rate of the light beam can also be modulated such that individual areas of the film to be exposed can be exposed for longer. The method of linewise exposure of a light-sensitive film is suitable in particular for electronically recording images stored in analogue or digital fashion. The number of the complete images which can be written within a specific time is, however, relatively low owing to the mode of procedure, since each pixel of the image must be exposed consecutively to the required quantity of light. A further known method for film exposure provides that a complete image is exposed all at once. Provided for this purpose is a two-dimensional light valve, for example a micromirror arrangement, also known as a digital mirror device or DMD, or a liquid crystal light valve or LCD light valve. In the case of this method, as well, the film transport must be interrupted for the purpose of exposure, and this limits the number of the possible images to be exposed in a specific time. The light valves must have an individual light valve element for each pixel. Customary horizontal resolutions for 35 mm cinematographic film are 2048 and 4096 pixels per line in the horizontal direction. This renders digital exposure of cinematographic films complicated and expensive. Furthermore, a defect of an individual pixel in the light valve will be visible in each image. It is therefore desirable to obtain a film exposer comprising continuous film transport, a reduced number of light valve elements and an improved defect tolerance to individual defects of the light valve elements.

SUMMARY OF THE INVENTION

The film exposer described in Claim 1 achieves this object. A method specified in Claim 12 describes how the film exposer according to the invention is driven. Also specified is a data structure which is advantageously suitable for storing data on light-sensitive film together with the film exposer according to the invention and in accordance with the method according to the invention. Advantageous refinements and developments of the invention are reproduced in the subclaims.

The film exposer according to the invention has a light source which illuminates a modulator fixed with reference to the light source. The modulator modulates the quantity of light striking the film. The modulator has a two-dimensional arrangement of light valve elements, denoted as elements below for short, the number of the elements arranged in a row transverse to the transport direction of the film corresponding to the number of the pixels of the image in this direction. A number of elements of the modulator lie next to one another in the transport direction of the film such that a two-dimensional arrangement results. The modulator is arranged here in a plane substantially parallel to the flat side of the film. In one embodiment of the invention, the modulator switches over between the states of "light on" and "light off", that is to say each element of the modulator optionally allows no light to fall onto the film, or allows a specific fixed quantity of light to fall onto the film. During the exposure, the film is guided continuously along the modulator. Each active element, that is to say each switched-on element of the modulator projects a specific quantity of light onto the film, the film integrating the quantity of light which is falling on. A pixel on the film which reaches a specific point in the exposure area of the modulator is therefore firstly exposed by an element of the first row of elements, which lies transverse to the transport direction of the film. It then passes further to an element of the second row of elements, which lies transverse to the transport direction of the film, and is exposed there anew with a specific quantity of light. This process is repeated until the pixel has been guided past the modulator and leaves the area. Various exposure levels of the pixel can be achieved at various elements owing to the continuous guiding past, depending on whether an element has projected light onto the film or not. The grading of the various exposure levels can be selected by means of the number of the elements of the modulator which lie in the transport direction of the film.

In one embodiment of the film exposer according to the invention, individual modulators are provided which project light of various wavelength regions, for example monochromatic light of the primary colours red, green and blue, onto the film. This film exposer can be used to expose light-sensitive film with colour images. The individual modulators can also be designed as separate regions of one modulator. Here, light of various colours is projected onto the film via the corresponding areas of the modulator.

In another refinement of the film exposer according to the invention, the modulator is illuminated consecutively with light of various wavelength regions, for example monochromatic light of the three primary colours red, green and blue. The film to be exposed is guided here past the modulator successively several times.

In another exemplary embodiment of the film exposer, a row, or several rows, of elements arranged transverse to the transport direction of the film are provided for the basic exposure of the film. The elements of this row or these rows project the same quantity of light onto the film in each case. Because of the nonlinear behaviour of the film transmission as a function of the quantity of light introduced, particularly in the case of low exposure levels, the basic exposure is utilized in order to reach the density-linear area of the film material. The non-density-linear exposure area of the film is left by means of the elements provided for the basic exposure, and the film is exposed in the density-linear area with the subsequent elements.

When an element of the modulator has a defect, the element being switched on permanently, for example, another element of the modulator, which lies in the same row in the transport direction of the film, can take over the function thereof. Since the maximum number of elements are used for exposure only for the highest exposure value, defective dark elements can be replaced by unused ones in the case of comparatively low total exposure values. Defective bright elements can automatically be used in the case of all exposure values which are greater than the number of the defective bright elements in a row. The desired total exposure value is reached because the sequence of exposure steps is arbitrary. It is preferred for this purpose to use one of the elements which undertakes the basic exposure of the film. Since what is important when exposing the film in the film exposer according to the invention is not the instant of exposure of the respective pixel, but only the absolute integrated quantity of light, this exchange of the functions of the elements of the modulator does not lead to an impairment of the image.

In a further development of the film exposer, there is provided on the side of the film averted from the modulator a sensor by means of which the function of the modulator can be checked, or by means of which the modulator can be calibrated. If no film is inserted between the modulator and the sensor, the light from the modulator falls directly onto the sensor.

In one exemplary embodiment, the sensor is a two-dimensional sensor, with a number of sensor elements in a two-dimensional arrangement which corresponds to the number of the elements of the modulator. In this case, the modulator is checked by all the elements projecting light onto the sensor and using the sensor elements to measure the quantity of the light received. In a further step, it can be checked whether all the elements of the modulator can be switched off, that is to say whether the light projection of all the elements can be switched off. When a defect is established in the case of one or more elements, the exchange of the function of the elements can be carried out as previously described. In another embodiment of the film exposer according to the invention, spare elements can be provided for this purpose. If it is not possible to make an exchange against spare elements, for example because no spare element is any longer available for the exchange, the resulting defect in the event of a failure of an element will be visible only upon maximum exposure of the film. The defect will therefore comprise at most one exposure level. When the defective element is switched on permanently, it is possible, as described above, to use it for the basic illumination of the film, and the defect will not be visible.

In another embodiment, an individual sensor with optical means is provided, the optical means directing the light of all the elements of the modulator onto the sensor. To control the individual elements, the elements are activated successively and the light striking the sensor is measured. Quick control is possible by switching on all the elements and measuring the total quantity of light. Given a known number of elements and a known light intensity of the individual elements, all that is required is to compare the measured quantity of light with a calculated quantity of light. Only when deviations result is the testing of individual elements carried out. The optical means are, for example, lens arrangements, light guides, mirrors or the like. Optical means can also be provided in the embodiment with the two-dimensional sensor when the sensor is not arranged directly opposite the modulator.

The writing speed of the film exposer is determined by the switching time of the elements of the modulator. Given an assumed switching time of 100 microseconds, a writing speed of 10 000 lines per second can be achieved. For the assumed resolution of a 35 mm cinematographic film of 1500 lines in the horizontal direction, it is therefore possible to expose approximately six complete images per second.

In a further development of the film exposer according to the invention, various areas of the modulator project light of various intensity onto the film. In this embodiment of the invention, the modulator is divided into a number of various zones each having a homogeneous light intensity. In one embodiment of the invention, zones are provided which each have, for example, eight elements belonging to the zone, the elements being arranged in a row in the direction of the film transport. The zones differ from one another by a multiple of eight in their intensity. The different intensity of the illumination can be implemented, for example, by reflective or absorptive elements in the beam path. When elements lie in the transition zone of two areas, these can be omitted for the exposure, or the elements are used for the purpose of illumination with intermediate levels of the light intensity.

In another embodiment of the film exposer, the latter is used for recording data onto the light-sensitive film. In this process, in one embodiment, the number of possible grey levels that can be represented by the film exposer is recorded in an area preceding the data. This area can be used for calibrating a sensor used to read out the data. As an alternative to this, the minimum and maximum exposure can also be recorded for the purpose of calibration in the area preceding the data.

The film exposer according to the invention advantageously permits continuous transport of the film during the exposure operation. The jerky movement of the film such as is required for exposure by individual image or in linewise fashion is excluded. A mechanical loading, associated therewith, of the film and of the film exposer is also thereby excluded.

The modulator of the film exposer according to the invention is optionally designed as a reflective or transmissive modulator.

BRIEF DESCRIPTION OF THE DRAWINGS

The invention is described below with reference to the drawing, in which:

FIG. 3 shows a second illustration of a film exposer known from the prior art;

FIG. 4 shows a third illustration of a film exposer known from the prior art;

FIG. 6 shows an exemplary illustration of the exchange of defective elements of the modulator;

FIG. 7 shows a schematic illustration of areas of the modulator having a different light intensity;

The same or similar elements are denoted in the figures by the same reference numerals.

DETAILED DESCRIPTION OF PREFERRED EMBODIMENTS

Figure 1:
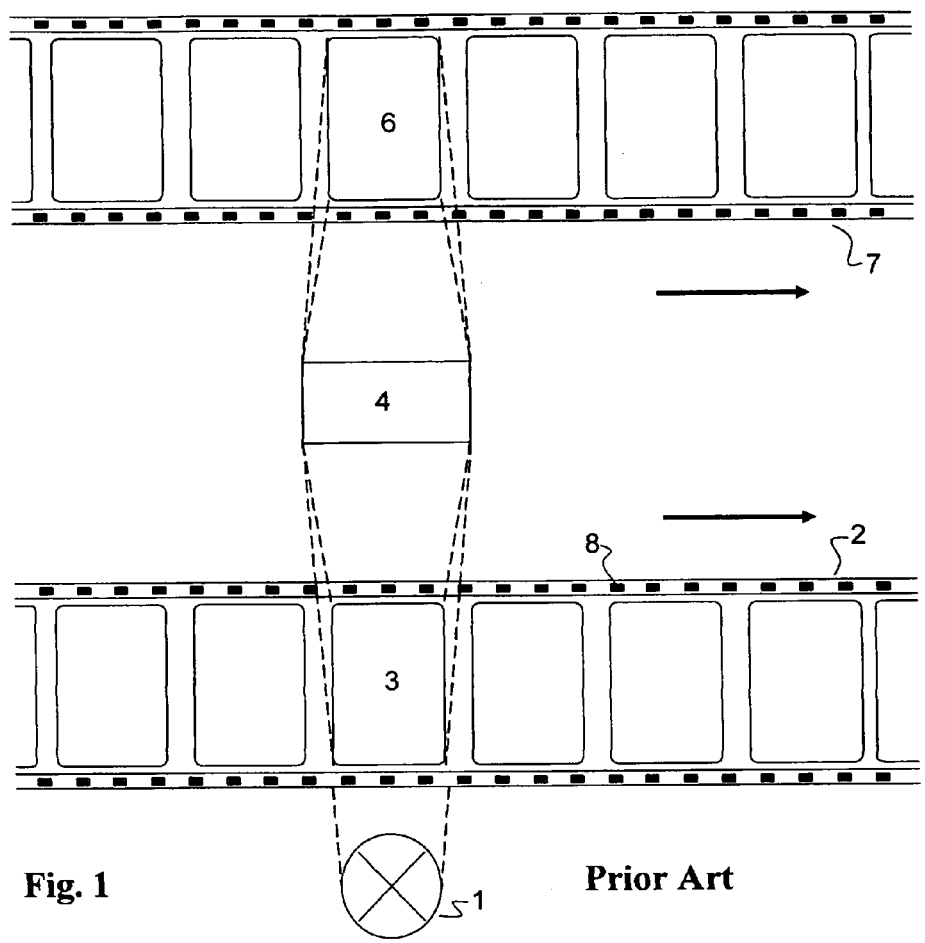
FIG. 1 shows a schematic illustration of a film copier known from the prior art.

FIG. 1 illustrates a film copier such as is known from the prior art. A light source 1 illuminates a film 2 which serves as an exposure master. The film 2 has individual images 3. Perforation holes 8 are provided on both sides of the film for the purpose of film transport. The film is transported from left to right in the figure, as indicated by the arrow. The film may be moved continuously or step-wise in this case. The light shining through the image 3 from the light source 1 is projected onto a film 7 by an optical system 4. The film 7 is moved parallel to the film 2.

Figure 2:
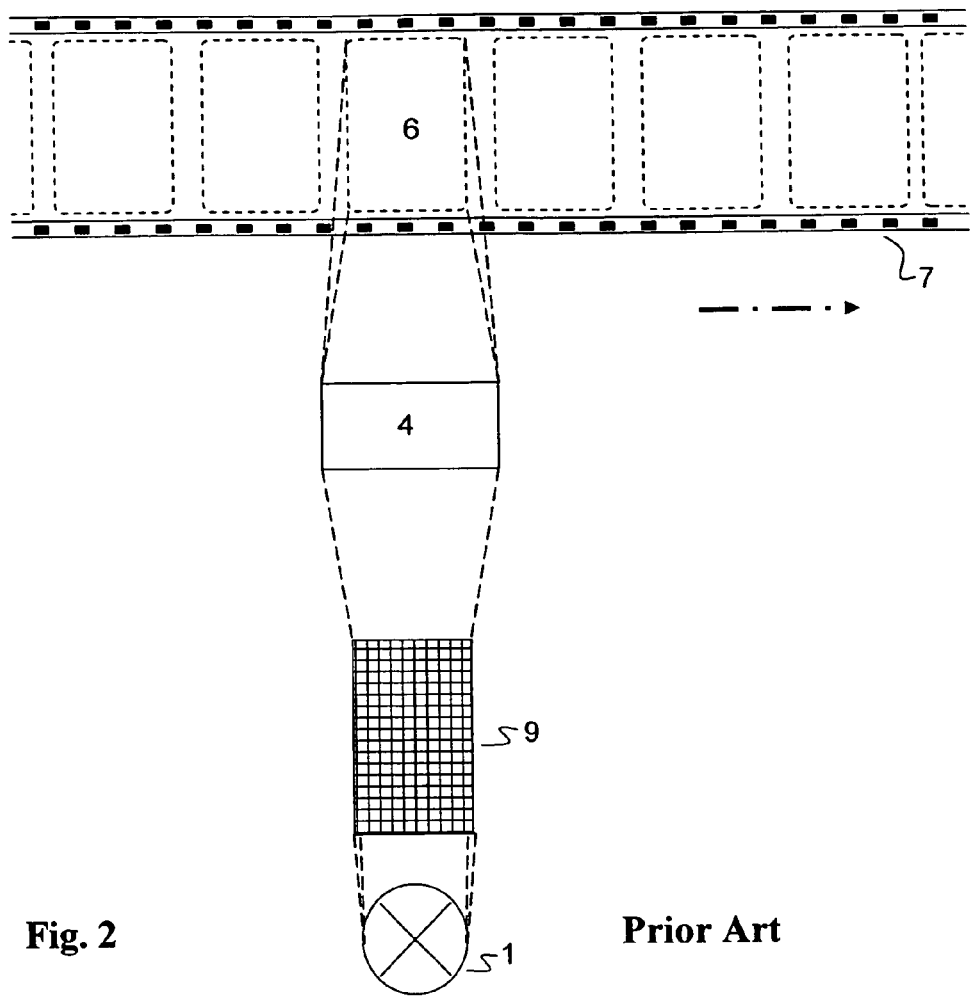
FIG. 2 shows a first schematic illustration of a film exposer known from the prior art.

Illustrated in FIG. 2 is a film exposer such as is known from the prior art. A light source 1 illuminates a two-dimensional light valve 9. The two-dimensional light valve has just as many pixels in horizontal and vertical directions as does the image 6 projected onto the light-sensitive film. For this purpose, the light valve 9 has a corresponding number of elements which represent one pixel in each case. Also illustrated in the figure is an optical system 4. In the case of the film exposer from FIG. 2, the film is transported in stepwise fashion, just as in the case of the film exposer described in FIG. 1, as is indicated by the dash-dotted arrow. In the case of the film exposer illustrated in the figure, the light valve 9 is a light valve transilluminated from behind, for example an LCD element.

A further example of a film exposer such as is known from the prior art is illustrated in FIG. 3. The embodiment corresponds substantially to that described in FIG. 2. In contrast to FIG. 2, in this case the light valve 9 is a reflective light valve, for example a micromirror element, also known as a digital mirror device or DMD, or an LCOS element.

A third example of a film exposer known from the prior art is illustrated in FIG. 4. In this case, the light source emits a focused light beam, for example a laser beam, which is guided in linewise fashion over the film 7 by means of a deflecting unit and a corresponding optical system 4. As described further above, in this process either the intensity of the light beam is modulated, or the rate of deflection of the light beam is modulated. In both cases, every exposed pixel integrates a corresponding quantity of light. The film 7 is transported further either after the exposure of a line or after the exposure of a complete image 6. The lines with the individual pixels are indicated by the dotted lines in the images already exposed. The stepwise transport of the film is indicated by the dash-dotted arrow.

Figure 5:
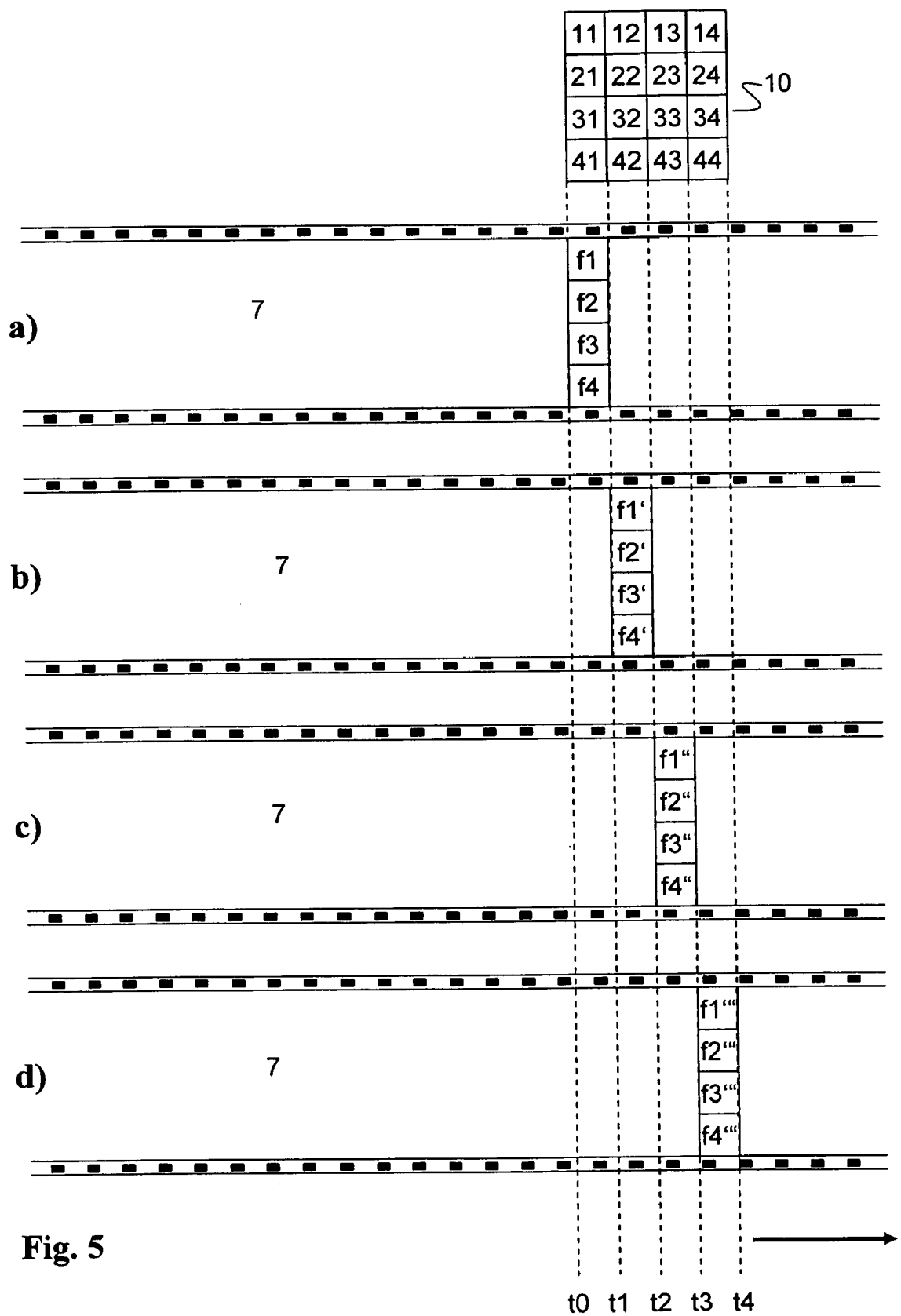
FIG. 5 shows a schematic illustration of the exposure of a film by means of a film exposer according to the invention.

Various stages in the exposure of a light-sensitive film in accordance with the invention are illustrated in FIG. 5. To improve clarity, the modulator 10 according to the invention is illustrated as a matrix composed of 4×4 elements. The film is moved continuously from left to right, as illustrated by the solid arrow. It is illustrated in FIG. 5a how four areas f1, f2, f3, f4 of the film 7 reach the projection area of the modulator 10. Firstly, the elements 11, 21, 31 and 41 of the modulator 10 are imaged onto the areas f1, f2, f3, f4. The film 7 is transported further in FIG. 5b. The areas f1', f2', f3' and f4', which have already been exposed by the elements 11, 21, 31, 41, are now exposed by the elements 12, 22, 32 and 42. The film 7 is transported further in turn, in FIG. 5c. The areas f1", f2", f3" and f4" already exposed by the preceding elements are now exposed by the elements 13, 23, 33 and 43. The film is transported further in FIG. 5d. The areas f1''', f2''', f3''' and f4''' already previously exposed are now illuminated by the elements 14, 24, 34 and 44 of the modulator. Thereafter, the exposed areas leave the exposure area of the modulator 10. Depending on whether the elements of the modulator are switched on or switched off, the adjusted quantity of light is integrated no times to four times by the respective area of the film.

The procedure in exchanging a defective element of the modulator with a functional element is shown diagrammatically in FIG. 6. The modulator 10 already described in FIG. 4 is illustrated in FIG. 6a as a matrix composed of 4×4 elements. The row of elements 11, 21, 31 and 41 is provided for the purpose of basic exposure. These elements are permanently switched on, this being illustrated in the figure by the dark background. The remaining elements of the modulator are switched on or switched off depending on the image content or data content. The element 23 is permanently switched on by a defect, and this is likewise indicated by the dark background. Since a permanently switched-on element is required in this row in any case for the purpose of exposure, the functional element 21 is used to expose data contents, that is to say switched on or off depending on requirement. The element 23 permanently switched on by the defect now takes over the function of basic illumination, as illustrated in FIG. 6b.

The modulator 10 is shown in a simplified illustration in FIG. 7. The modulator 10 has four different areas which expose a film with different light intensities in each case. By way of example, elements 11, 21, 31 and 41 are combined to form an area in FIG. 7. The elements 12, 22, 32 and 42 are combined to form a further area, as are the elements 13, 23, 33 and 43 as well as the elements 14, 24, 34 and 44. The different light intensity of the areas is indicated by the variously intense shading of the background. The exposure can be carried out with various exposure levels by appropriately driving the areas of varying light intensity. The number of consecutive elements of equal light intensity which are required to achieve a specific exposure can advantageously be reduced in this case. Only one element of each intensity level is respectively shown in the figure. However, a number of elements with one intensity level can also be provided in the transport direction of the film (not illustrated in the figure).

Figure 8:
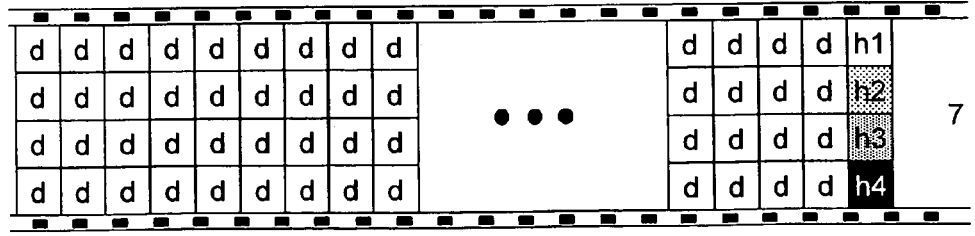
FIG. 8 shows a schematic illustration of a light-sensitive film with recorded data.

FIG. 8 illustrates diagrammatically a section of a film which is written with data. The film has at its front end, illustrated on the right in the figure, an area in which the various exposure levels used are reproduced. This area can be used, for example, for calibrating a read-out unit. Arbitrary data d are recorded in the following section of the film. The data d in each case have one of the exposure levels which was reproduced in the area preceding the data. Owing to the exposure with various exposure levels, it is possible to store per pixel stored on the film a multivalue datum corresponding in value to the number of the various exposure levels used.

Figures 9, 10:
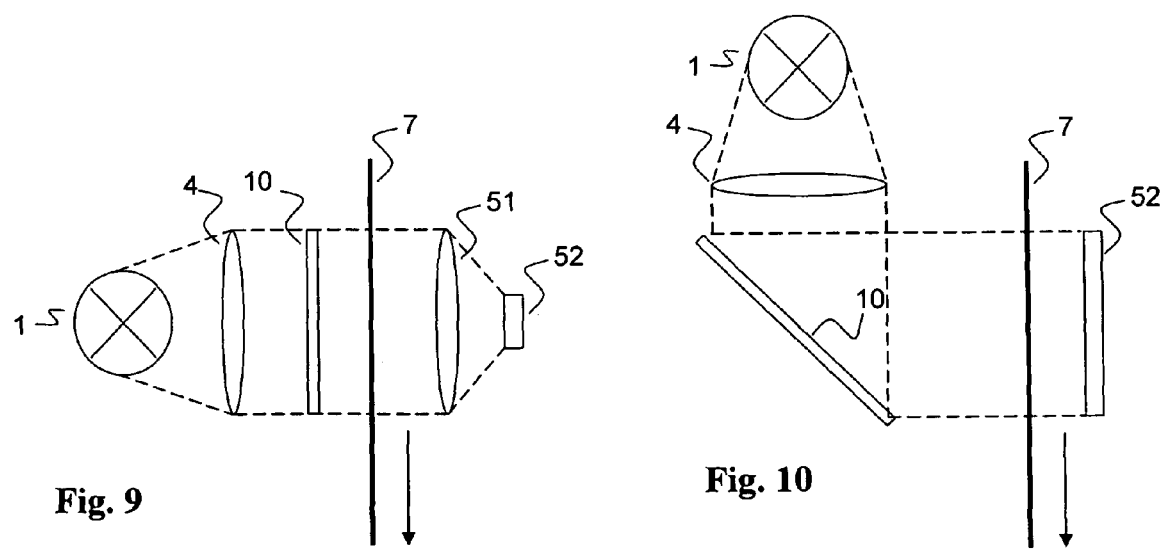
FIG. 9 shows a first schematic illustration of the film exposer according to the invention with a sensor.
FIG. 10 shows a second schematic illustration of a film exposure according to the invention with a sensor.

FIG. 9 shows a diagrammatic illustration of a film exposer according to the invention having a sensor for monitoring the modulator 10. A light source 1 focuses light onto the transmissive modulator 10 via an optical system 4. The transmissive modulator 10 permits the light to strike a film 7 guided past the modulator, depending on how it is driven. The film 7 is illustrated diagrammatically in the figure in a side view. The continuous movement of the film in one direction is indicated by the solid arrow. In order to monitor the function of the modulator 10, optical means 51 are provided which direct the light coming from the modulator 10 onto a sensor 52. When no film 7 is located between the modulator 10 and the optical means 51, it is possible to infer a correct function from the known intensity of the light source 1 and the known number of the elements of the modulator 10 in conjunction with simultaneous activation of all the elements of the modulator. The sensor 52 in this case receives the entire light from the modulator, and the measured value is compared with a stored desired value. All the elements of the modulator 10 are deactivated in a second step so that no light falls onto the sensor in the ideal case. When deviations result between the measured value of the light intensity and the stored value, it is possible to check the function of individual elements of the modulator 10 by driving individually in each case.

FIG. 10 shows a further diagrammatic example of a film exposer according to the invention. The modulator 10 is a reflective modulator in this case. As already described in FIG. 8, the light from a light source 1 is projected onto the modulator via an optical unit 4. Depending on how the elements are driven, the modulator 10 reflects the incident light onto a film 7 guided past the exposure unit. In the switched-off state of an element of the modulator 10, no light is reflected onto the film. As previously described, a sensor 52 is arranged on the side of the film averted from the modulator. When no film 7 is located between the modulator and the sensor, the function of the modulator 10 can be checked by means of the sensor 52. In the figure, the sensor 52 is an area sensor which has a number of sensor elements corresponding to the number of the elements of the modulator 10. The individual elements of the modulator 10 can be checked simultaneously in this case. It is also possible to provide means 51 (not illustrated in the figure) for directing the light coming from the modulator 10 onto the sensor. What is claimed, is

The invention claimed is:

1. A film exposer for exposing a light-sensitive film, having a light source, a modulator fixed with reference to the light source, for modulating a quantity of light striking the film, the modulator being a two-dimensional arrangement of elements, each of which permitting an adjustable quantity of light to strike the film, and wherein the film is continuously transported in a direction along the modulator; wherein the number of the elements in a row in the transport direction of the film is greater or less than the resolution of the exposed image in the transport direction.

2. The film exposer of claim 1, wherein the quantity of light projected onto the film by the individual elements of the modulator can be adjusted.

3. The film exposer of claim 1, wherein the elements have an exposure function that can be interchanged within a portion of a row of elements lying in the transport direction of the film.

4. The film exposer of claim 1, wherein the number of the elements in a row transverse to the transport direction of the film corresponds to the resolution of the exposed image in this direction.

5. The film exposer of claim 1, wherein modulators are provided for light sources of different wavelength regions, the film being guided along all the modulators.

6. The film exposer of claim 1, wherein the two-dimensional modulator is divided into zones of various, homogeneous light intensity.

7. The film exposer of claim 6, wherein absorptive or reflective elements are provided in the beam path of the light in order to adjust the different light intensities.

8. A film exposer for exposing a light-sensitive film, having a light source, a modulator fixed with reference to the light source, for modulating the quantity of light striking the film, the modulator being a two-dimensional arrangement of elements, each of which permitting an adjustable quantity of light to strike the film, wherein the film is continuously transported along the modulator; and wherein a sensor is arranged on a side of the film across from the modulator by means of which the function of the modulator can be checked.

9. The film exposer of claim 8, wherein the sensor is a two-dimensional arrangement of sensors which corresponds to the arrangement of the elements of the modulator.

10. The film exposer of claim 8, wherein the sensor is assigned optical means.

11. A method for exposing a light-sensitive film by means of a film exposer according to claim 1, wherein the film is guided continuously past a modulator and integrates the light projected by a number of elements of the modulator which lie one behind another in the transport direction of the film.

12. The method of claim 11, wherein one or more rows of elements transverse to the transport direction of the film illuminate the film with the same intensity and effect a basic exposure of the film.

13. The method of claim 11, wherein the function of defective elements of a row of elements in the transport direction of the film is taken over by other elements of the same row.

14. The method of claim 11, wherein the quantity of light projected onto the film by each of the elements of the modulator is adjusted individually.

15. The film exposer of claim 9, wherein the sensor is assigned optical means.

* * * * *